United States Patent [19]

Alpár et al.

[11] Patent Number: 4,927,573

[45] Date of Patent: May 22, 1990

[54] PROCESS FOR THE PRODUCTION OF BUILDING UNITS FROM AFTERHARDING MATERIALS

[75] Inventors: Tibor Alpár; János Györvári; Ernö Schmidt, all of Szombathely, Hungary

[73] Assignee: Fakombinat, Szombathely, Hungary

[21] Appl. No.: 407,430

[22] Filed: Sep. 14, 1989

Related U.S. Application Data

[62] Division of Ser. No. 186,426, Apr. 26, 1988.

[30] Foreign Application Priority Data

Mar. 5, 1987 [HU] Hungary .............................. 2004/87

[51] Int. Cl.$^5$ ...................... B28B 3/20; B29C 47/00; C04B 40/00
[52] U.S. Cl. ..................................... 264/40.1; 264/82; 264/101; 264/148; 264/211.11
[58] Field of Search ....................... 264/40.1, 40.3, 82, 264/83, 101, 211.11, 148, 157, DIG. 43; 249/20, 22, 108, 109; 425/63, 64, 74, 178, 578, 580, 583, 585, 97, 380

[56] References Cited

U.S. PATENT DOCUMENTS

| | | | |
|---|---|---|---|
| 1,899,708 | 3/1933 | Miller | 425/439 X |
| 2,501,595 | 3/1950 | Bohannon | |
| 2,604,659 | 7/1952 | Eppler | |
| 3,358,342 | 12/1967 | Spence | 264/82 X |
| 3,826,411 | 7/1974 | Kalns | 425/209 X |
| 4,093,690 | 6/1978 | Murray | 264/82 |
| 4,117,059 | 9/1978 | Murray | 264/82 |
| 4,117,060 | 9/1978 | Murray | 264/82 |
| 4,156,587 | 5/1979 | Christian | 264/87 X |
| 4,251,477 | 2/1981 | Christian | 264/82 |
| 4,427,610 | 1/1984 | Murray | 264/82 |
| 4,436,498 | 3/1984 | Murray | 264/82 X |
| 4,685,873 | 8/1987 | Willard et al. | 264/83 |

FOREIGN PATENT DOCUMENTS

| | | |
|---|---|---|
| 2539674 | 3/1977 | Fed. Rep. of Germany ... 425/378 R |
| 582967 | 12/1977 | U.S.S.R. |
| 1337014 | 11/1973 | United Kingdom ................... 264/82 |

Primary Examiner—Jan H. Silbaugh
Assistant Examiner—Karen D. Kutach
Attorney, Agent, or Firm—Baker & McKenzie

[57] ABSTRACT

A process for the production of building units from an afterhardening mixture containing cement and/or lime as binding material includes the following steps. The raw mixture is continuously fed and pressed by stamping into a die with $CO_2$ gas at a pressure higher than atmospheric being passed through the raw mixture in the die space. Through an instantaneous reaction of carbonation, the material is hardened to a formed body. The $CO_2$ gas is prevented from escaping by a gastight seal in the vicinity of the inlet port of the die. Further towards the outlet port, the pressure of the $CO_2$ gas is decreased. In the vicinity of the outlet port only as much $CO_2$ gas is fed as is necessary for the completing of the chemical reaction. Thus, any loss of gas will be minimized. The continuously discharged body is cut to size by using a saw.

8 Claims, 7 Drawing Sheets

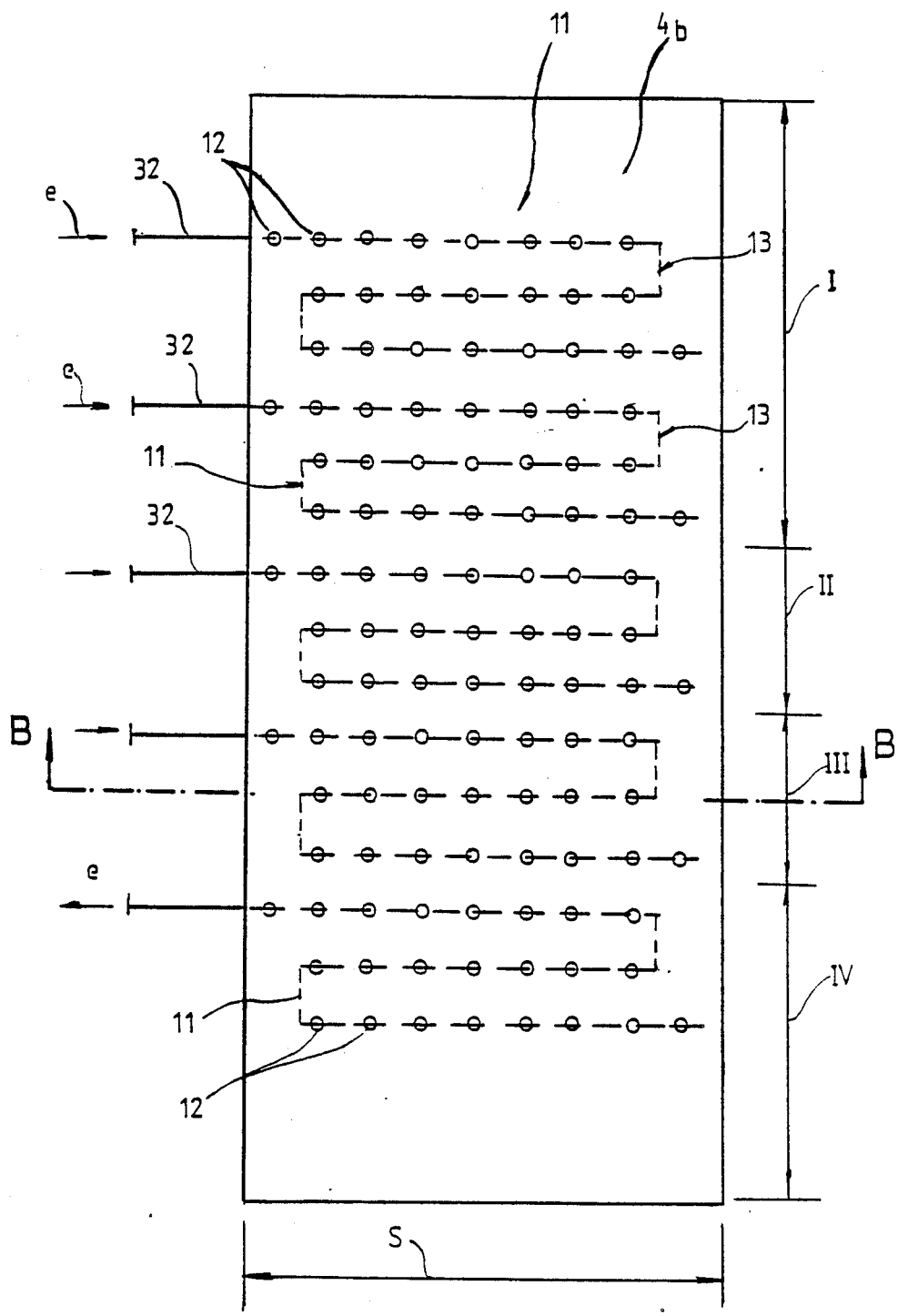
Fig. 3/b

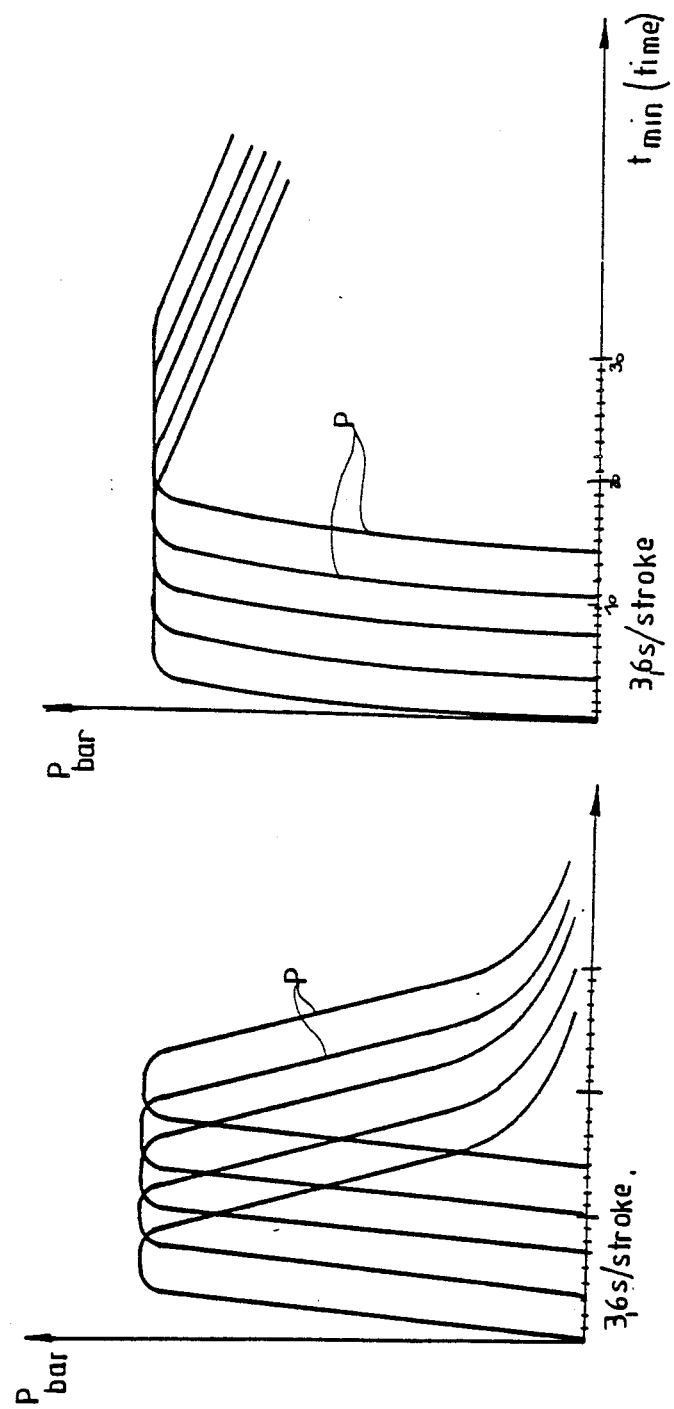

PROCESS FOR THE PRODUCTION OF BUILDING UNITS FROM AFTERHARDING MATERIALS

This is a division of application Ser. No. 186,426, filed Apr. 26, 1988.

BACKGROUND AND SUMMARY OF THE INVENTION

The invention relates to a process for the production of bodies, especially building units from afterhardening materials containing hydraulic binder, particularly cement as setting agent.

Such building unit production methods are known, at which hardening of the cement-set moulded material is accelerated by injection of $CO_2$ gas into the raw mixture (e.g. U.S. Pat. No. 4,093,690. These methods are based on carbonation, i.e. a process when the large amount of $Ca(OH)_2$ compound present in the cement mortar quickly changes over to limestone upon the effect of $CO_2$ gas. The limestone molecules being formed during this process, become so tightly bonded to each other that the product, e.g. building panel may reach even 35–50% of its 28-day-strength in 5–30 minutes, though hydration of the binding material, e.g. cement has not even begun.

The carbonation takes places generally in a closed space containing the raw mixture to be set with cement by producing differential pressure, then a pressure exceeding the atmospheric one is brought about with the injection of $CO_2$ gas, as a result of which the $CO_2$ gas may penetrate into the pores of the raw mixture and chemical reaction takes place. The raw mixture is filled into a mould determining the shape of the product to be produced and compacted, then placed into a closed space together with, or removed from the mould. These methods, however, are fairly costly, because the closed spaces require careful sealing to be realized with difficulty and at high cost. Apart from this, the alternating use of vacuum and high pressure is lengthy, thus, the techologies allowing only a step by step production carried out with several operations (filling into the mould and compacting; filling and discharging the carbonation space; carbonation) take fairly long time.

A building unit production technology combined with carbonation is described in the Hungarian patent specification No. 189.455 where elastic fibrous material as additive is used for the preparation of the cement-set raw mixture, and there is utilized the characteristic feature of this mixture for more or less elastic reversion after compaction, thus, its volume expands when the compressive force is stopped during the setting time of the hydraulic binding material, i.e. cement. The raw mixture placed between two press-plates is compressed in a greater degree in the vicinity along their flanges than the rest of the mixture—either by using a thicker part along the flanges of the press-plate or by applying a locally greater amount of raw mixture—thus, a strip of higher density, consequently of lower gas permeability is formed at the flanges, than within. This strip of higher density along the flanges functions as a seal, and prevents the $CO_2$ gas injected for carbonation from escaping from the mixture on the sides. Although this method is more favourable than the former ones its drawback resides firstly in its periodicity, thus in its relatively low productivity and in the fact that a solid end-product can be produced only from mixtures containing elastic fibrous material.

The invention aims at providing a process for the production of bodies, particularly building units from an afterhardening material by accelerating the setting with carbonation, which partly allows a continuous production thereby considerably improving the productivity and economic efficiency, and partly it is not restricted to the use of afterhardening mixtures prepared with an elastic fibrous additive as a starting material (to be moulded), whereby it substantially extends the choice of products to be economically produced with carbonation.

The invention is based on the recognition that when the afterhardening material is passed through a moulding space open at both ends, and escape of the $CO_2$ gas is prevented by a continuous mechanical compaction of the raw mixture in the vicinity of the point of inlet and by reducing the pressure of the $CO_2$ gas to a minimum—in the given case to the atmospheric pressure—in the vicinity of the point of outlet, and the $CO_2$ gas is injected between these two points into the mould space evenly distributed along the mould face(s), however under a pressure reduceed from the inlet towards the outlet, the production may be made continuous, and the product emerging from the mould space will appear in a solid, moulded state as a result of carbonation taking place in the mould space.

On the basis of this recognition, the problem was solved by a process according to the invention, in the course of which the still not hardened mixture is admitted into the mould, where carbonation reaction is brought about by injection of $CO_2$ gas into the mixture, and thereby the mixture is hardened, said process comprising the steps of pressing the afterhardening mixture continuously through the mould space open at both ends, while $CO_2$ gas is injected into the material under pressure reducing from inlet port of the material toward the outlet port of the hardened body, and creating a quasi gastight layer from the afterhardening material with mechanical compaction in this mould space in the vicinity of the inlet port and bringing about a quasi-gastight condition between this layer and the mould surfaces, and in the vicinity of the outlet port injecting as much amount of $CO_2$ gas into the mould space as necessary for the complete, or essentially complete chemical reaction of carbonation. The afterhardening material is stamped-pressed into the mould space preferably with a reciprocating device.

Expediently, the $CO_2$ gas is injected into the mould space through at least one of the confining surfaces under pressure exceeding the atmospheric pressure; and when passed through the afterhardening material the gas of reduced pressure and quantity is discharged from the mould space through at least another mould face, and/or vacuum is applied to at least one face of the mould space, and this way the $CO_2$ gas is made flown through the material, or its flow is intensified.

According to another advantegeous feature of the invention, in a zone following the compacted layer of material in the vicinity of the inlet port, $CO_2$ gas at a pressure of suitably 3–6 bar is injected into the pores of the mixture then—looking in the direction of the material's movement—in a second zone, where the instantaneous explosion-like reaction of carbonation takes place, $CO_2$ gas under a lower pressure of e.g. 2–3 bar is injected into the material, the quantity of which is essentially the same as that of the $CO_2$ gas consumed by the reaction, whereby the carbonation reaction is continued, then in a third zone $CO_2$ gas under even lower pressure of e.g. 1–2 bar is injected into the mould space, whereby essentially full completion of the carbonation reaction is realized. A further embodiment of the process is characterized by creating a balancing zone in the mould space situated directly behind the outlet port of the material hardened by carbonation, where the gas outflow is checked, and in the zone(s) behind the balancing zone, gas is injected as a function of the quantity of the outflowing amount and/or pressure of the gas. It is generally advisable to cut to size—suitably by sawing—the carbonation-hardened body leaving the mould space, and to inject the $CO_2$ gas into the mould space with a gas mixture, containing suitably at least 30% of $CO_2$ gas.

It may be advisable to inject the $CO_2$ gas into the raw mixture prior to feeding it into the mould. The setting process can be accelerated by this carbonation pretreatment.

The apparatus according to the invention contains a mould, a $CO_2$ gas-source, e.g. gas bottle and openings e.g. holes in at least one wall of the mould, suitable for injection of $CO_2$ gas into the mould space, the pressure of which exceeds the atmospheric pressure, and this apparatus is characterized in that the mould has an inlet port for feeding in the raw afterhardening mixture and an outlet port for discharging the body hardened by carbonation; a press mechanism situated in front of the inlet port for pressing the raw afterhardening mixture into the mould space, and moving the afterhardening mixture and the body hardened therefrom by carbonation through the mould space; and the holes leading into this mould space and used for injection of the $CO_2$ gas are divided into separate hole groups communicating with devices suitable for injecting $CO_2$ gas, at pressures to be separately controlled for each zone. It is expedient when at least one wall of the mould is provided with holes for outlet of the $CO_2$ gas remaining—in given case—after the completed chemical reaction of carbonation, which holes are expediently communicating with pipes connecting the $CO_2$ gas source, e.g. gas bottle with the mould plate containing the holes for injecting $CO_2$ gas into the mould space.

An embodiment of the apparatus is characterized by having a forward pipe for feeding the $CO_2$ gas into the mould space and a return pipe for feeding back into the forward pipe the $CO_2$ gas remaining—in a given case—after the completed carbonation reaction; a gas pump being connected to the forward pipe into which also the return pipe is leading, and—in up-stream direction of the gas flow—a pipe containing shut-off means, leading out of the $CO_2$ gas supply source, e.g. gas bottle being joint to the return pipe before the pump, and the forward pipe being interconnected through leg pipes containing valves with separate hole groups on the gas inlet side, while leg pipes containing similarly valves and leading from the hole groups into the return pipe are provided for discharging the gas remaining—in a given case—after the completed carbonation reaction. A vacuum pump can be inserted into the return pipe.

According to a further feature of the invention the hole groups on both the gas inlet side and the remaining gas outlet side is leading into separate closed chambers fitted expediently gastight to the outer face of the mould plates. Furthermore it may be of advantage, when the hole groups are leading from—e.g. meandering—ducts running inside the mould plates into the mould space, each duct communicating with one of the leg pipes emerging from the forward pipe or with one of the leg pipes leading into the return pipe.

According to another embodiment of the apparatus given by way of example, a device, e.g. a saw suitable for cutting up the carbonation-hardened body emerging from the mould space is arranged behind the outlet port of the mould.

According to another arrangement of the invention, chambers covering at least one of the hole groups are fitted to the outer side of the mould plates in the vicinity behind the outlet port of the mould, and gas outlet stubs containing control valves are leading out of the chambers.

A further embodiment of the apparatus is characterized by providing a press mechanism with a reciprocating beater, e.g. a piston, the cross sectional shape and size of which are the same or essentially the same as those of the mould's inlet port. In this case it is expedient, when the position of the mould and the path of the piston are vertical, the piston is fitted between guide rails, the guide rails are covered by a bell-shaped protective cover, the lower flange of which is running in the vicinity of the lower edge of the guide rails and a gap is provided for between said lower flange and the guide rails; and the actuating mechanism together with the protective cover is situated in a hopper serving for feeding the raw afterhardening mixture into the mould, the hopper leading into the upper end of the mould space.

BRIEF DESCRIPTION OF THE DRAWINGS

The invention will be described below in further details on the basis of the attached drawings illustrating a preferred embodiment of the apparatus by way of example, some of its structural details, graphs in connection with the exemplified process variants furthermore some of the building units producible with the method according to the invention, as follows:

FIG. 3b a view from the direction of arrow C, marked in FIG. 3a;

FIG. 6 a set of curves formed by the curves as shown in FIG. 4, illustrating the result of quickly repetetive compression processes;

FIG. 7 a set of curves different from the one shown in FIG. 6 in that it is formed by the curves shown in FIG. 5;

DETAILED DESCRIPTION OF THE INVENTION

Figure 1:
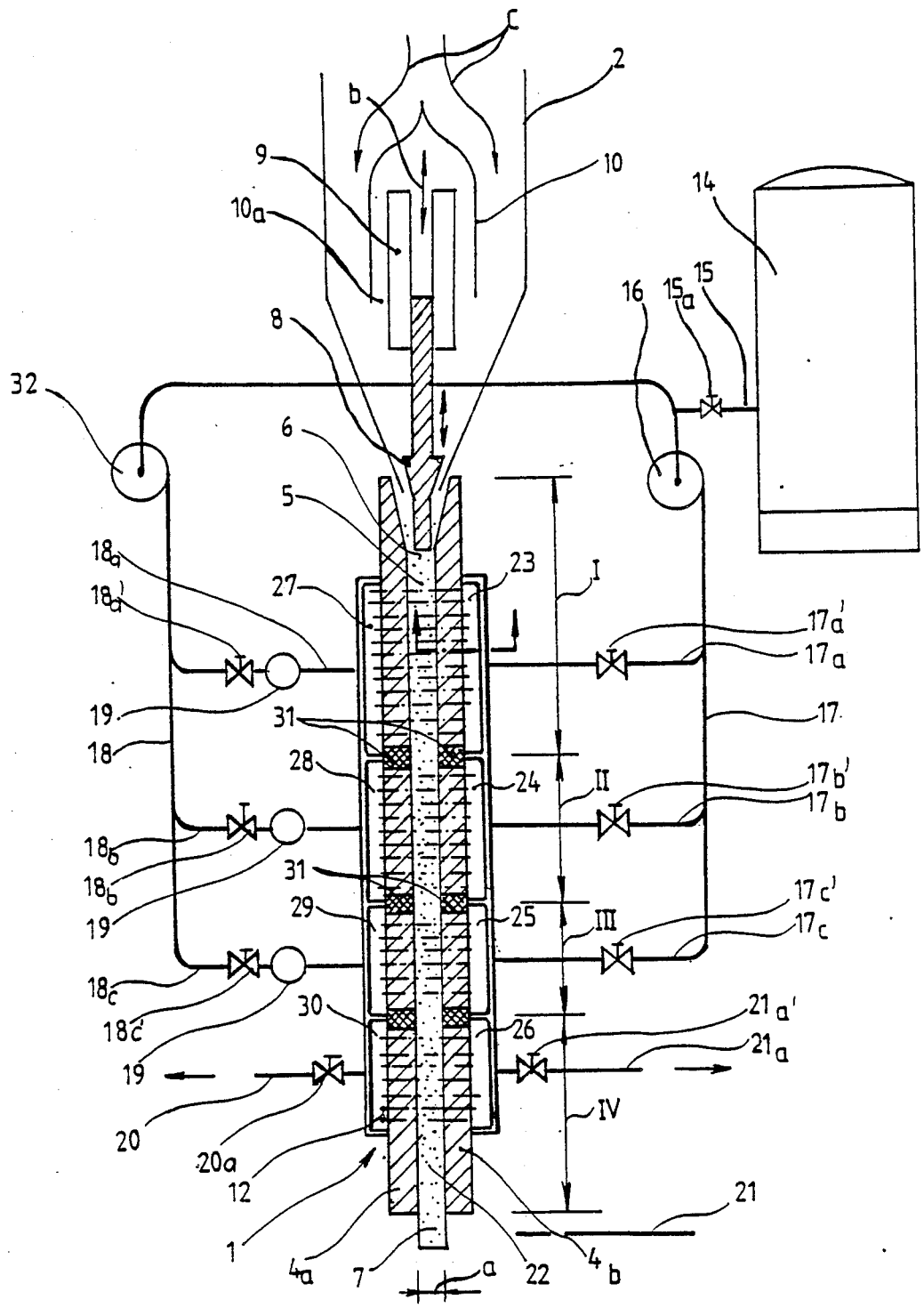
FIG. 1 is a schematic vertical cross section of the apparatus.
Figure 2:
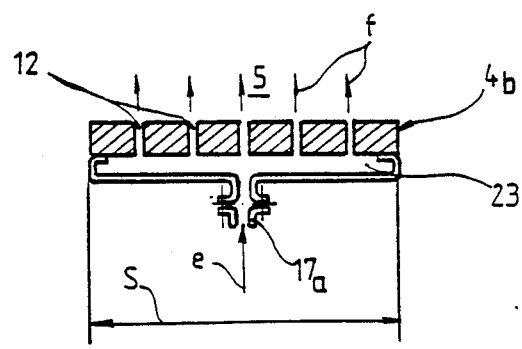
FIG. 2 a horizontal section along line A—A according to FIG. 1.

The apparatus shown in FIGS. 1 and 2 contains a mould designated as a whole with 1, a hopper 2 and a press mechanism 3 which in the present embodiment, comprises a piston 8 moving up and down as indicated by the double arrow b, having an expanding neck-part, an actuating mechanism (not shown), and vertical guide rails 9 on both sides of the piston 8 for guiding it while moving up and down.

The mould space 5 of the mould 1 is confined by vertical mould plates 4a, 4b of width s (FIG. 2) situated at a distance a from each other (FIG. 1) and by similarly vertical, narrow walls (not shown) perpendicular to the mould plates; the apparatus according to FIGS. 1 and 2 is namely used for the production of building panels 22 of thickness a, whose width perpendicular to the plane of the drawing (FIG. 1) is determined by the widthof the mould plates 4a, 4b measured in the same direction (value s in FIG. 2), whereas their other dimension, e.g. the length in the plane of the drawing (FIG. 1) may optionally be selected between practical limits. The mould 1 is open on its top and bottom; the inlet port of the mould is marked with reference number 6, and its outlet port with 7. The hopper 2 (feed hopper) is leading into the upper open end of the mould 1, and the piston 8 in the hopper fits into the inlet port 6 of the mould 1, i.e.: its cross sectional shape and size are essentially identical with, suitably somewhat smaller than those of the inlet port 6.

A bell-shaped protective cover 10 with its open end 10a turned down is arranged in the hopper 2 above the mould 1, which covers the guide rails 9 and whose lower flange is running in the vicinity of the lower ends of the vertical guide rails 9. The protective cover 10 is situated at a distance from the inner surface of the hopper 2 as well as from the outer surfaces of the guide rails 9, and its outer surface is suitably curved thereby facilitating downward movement of the raw mixture admitted in the direction of arrows c toward the inlet port 6 in the hopper 2.

The apparatus includes a gas tank 14 shown in FIG. 1, containing $CO_2$ gas at a pressure exceeding the atmospheric pressure, said gas tank being connected through an intermediate pipe 15 fitted with a shut-off means 15a to the return pipe 18 leading to the circulating gas pump 16. From the gas pump 16 a forward pipe 17 is leading out from which leg pipes 17a-17c are branching off fitted with valves 17a'-17c'. The leg pipes 17a-17c are leading into distribution chambers 23-25 situated along the mould plate 4b above each other, one of their confining faces being formed by the outer side of the mould plate itself, and the chambers 23-25 are separated from each other by—expediently gastight—sealings 31. A further chamber 26 is arranged below the chamber 25, being separated from this latter similarly by sealing 31, and having a deaerating and gas pressure compensation stub leading out therefrom and fitted with valve 21a.

Four chambers are adjoining also the outer surface of the mould plate 4a marked—going downwards from the top—with reference numbers 27-30. Leg pipes 18a-18c are leading out from the chambers 27-29, a manometer 19 and one of the valves 18a'-18c' being built in each of the leg pipes. The leg pipes 18a-18c are connected to said return pipe 18 in which a vacuum pump 32 is inserted. A deaeration and gas pressure compensation stub 20 fitted with valve 20a (control valve) is leading out of the lowest chamber 30. The chambers 27-30 are also separated from one another by sealings 31.

Holes 12 are passing through the mould plates 4a, 4b as clearly shown in FIG. 2, while the same holes are illustrated with dotted lines in FIG. 1. Thus, the holes 12 establish gas passage connection between the mould space 5 and the chambers 23-26 and chamber 27-30, respectively (only chamber 23 is shown in FIG. 2).

The mould 1 is divided into technological zones designated—going downwards from the top—by I-IV, each comprising a pair of chambers 23, 27; 24, 28;, 25, 29; and 26, 30; the function of these zones will be described further in the part dealing with operation of the apparatus.

Figure 3A:
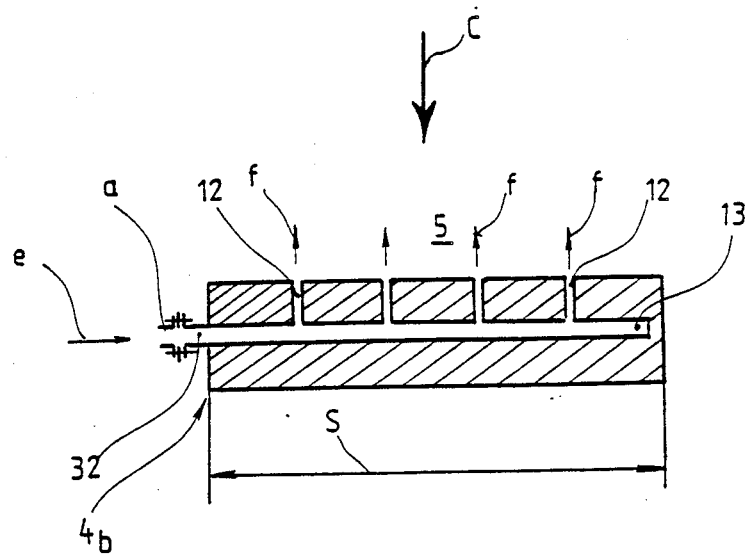
FIG. 3a an embodiment of one of the mould plates drawn to a larger scale, showing the sectional view along line B—B according to FIG. 3.

The gas can be injected into the mould space 5 not only as shown in FIGS. 1 and 2 but also with the structural solution shown in FIGS. 3a, 3b. In this case, the mould plates 4a, 4b contain a duct system formed according to the said technological zones I-IV. The uppermost zone I has two, and each of the zones II-IV has one meandering hole group 11 for transmitting the gas, whose holes 12 are leading out similarly from a meandering gas distributing duct 13, and which are running in the interior of the mould plate 4b. (For the sake of better overview, only four holes 12 leading into the mould space 5 are shown in FIG. 3a.) Each gas distribution duct 13 has an inlet stub 32 connected to one of the leg pipes 17a... 17n (in the present example to leg pipe 17a according to FIG. 3a) leading out of the forward pipe 17. Naturally, valves 17a'-17n' are installed in each leg pipe to adjust independently the gas pressure of $CO_2$ flowing out of each hole group 11. Duct and hole systems identical to those in FIG. 3a, 3b, are to be provided for in the mould plate 4a, where the return pipe 18 for each hole group is connected to the leg pipes 18a-18n.

The chambers 23-26 and 27-30 in FIGS. 1 and 2, as well as the hole groups 11 connected to independent gas pipes according to FIGS. 3a, 3b offer the possibility to inject the $CO_2$ gas into the mould space 5 in the locally determined zones under different pressures.

Production of the building panel with the apparatus according to FIGS. 1 and 2 (as well as FIGS. 3a, 3b) is carried out as follows:

The afterhardening raw mixture containing cement as binding material is fed into the hopper 2 at a steady rate and continuously according to arrows c shown in FIG. 1. The afterhardening material passes downwards to the inlet port 6 of the mould 1. The piston 8 is kept in reciprocating motion as indicated by the double arrow b. The piston 8 performs about 15-300, mainly 100-150 compression steps per minute, i.e. the up-and-down motion of the piston is variable—depending on the building unit to be produced and/or on the basic material—within wide limits and it may also be very fast. The cover 10 prevents the raw mixture from passing to the upper end of the guide rails 9, which would cause troubles in or inhibiting the run of the piston 8 pressing the afterhardening material from the hopper 2 in between the mould plates 4a, 4b, i.e. into the mould space 5. As a result of this pressing in, density of the raw mixture increase—due to the relaxation—to the multiple of the value preceding its compression. Part-quantities of the material in proportion with the stroke of the piston 8 fill up the mould space 5, and the carbonated cement-set material treated with $CO_2$ gas (or with the $CO_2$ component of a gas mixture) while passing through, leaves the outlet port 7 of the mould 1 in a hardened condition continuously.

The above production technology to be described subsequently in detail including its phases is enabled by the factors as follows:

the cement-set raw mixture—prepared practically by any additive—is always of a porous texture. Extent of the porosity depends on the measure of additive components of the mixture (e.g. size of grain and/or fibre) and on the compression. Porosity means that the mixture is permeable to gas and this feature has an important role in the carbonation, because the $CO_2$ gas can only be injected in a gas-permeable composition of materials;

the highest internal pressure (stress) in the mixture arises in the vicinity of the inlet port 6 of the mould 1, dropping as continuously going downwards in the mould space 5. As a result of the said maximum internal pressure, the material will become quasi gastight to such an extent, that the $CO_2$ gas injected into the mould space 5 can not escape from the mould through the inlet port 6. In other words: the gastight condition of the product is ensured by its still unhardened, but already compacted material.

Returning to the description of operation of the apparatus according to FIG. 1, the material passed downwards by the piston 8 through the mould space 5 is treated in the technological zones I-IV, the carbonation taking place mainly in zones I-III.

By stamping in the material in the uppermost part of the zone I in the vicinity of the inlet port 6, a quasi gastight condition is brought about in the material—as referred to above—i.e. mechanically by utilizing also the relaxation force of the compressed material, the $CO_2$ gas injected into the material in the mould space 5 is prevented from escaping through the chamber 23 and the holes 12 (see also FIG. 2). (Since both the feeding of the raw mixture and stamping-pressing are continuous, the quasi gastight core is constantly present in the upper part of the mould during the whole process of production, by way of continuous reproduction). Effect of the mechanical compaction (though at a downwardly decreaseing extent) extends to the whole zone I, the value of the relaxation force is high, thus, a fairly high gas pressure and/or the use of vacuum from the wall $4b$ of the mould are required for injecting the $CO_2$ gas into the pores of the raw mixture; so to say the $CO_2$ gas has to be pressed into the pores of the mixture. The required gas pressure, e.g. 6 bar can be set with the valve $17a'$ (FIG. 1). The efficiency of injecting the $CO_2$ gas into the mixture can be improved by using the vacuum pump 32; in this case the valve $18a'$ is open. The pressure conditions of the gas flowing through can be controlled with the manometer 19 built into the leg pipe $18a$, and the valves $17a'$, $18a'$ are adjustable as necessary. By use of a vacuum of e.g. 0.5 bar a differential pressure is brought about on the inner faces of the mould plates $4a$, $4b$, whereby the transversal gas flow from the mould plate $4b$ towards the mould plate $4a$ will obviously become more intensive, and the pores of the mixture will evenly be filled with $CO_2$ gas in the whole cross section.

The pores of the mixture in zone I will be filled up with $CO_2$ gas, while the unnecessary gas of lower pressure (e.g. 3 bar) entering the chamber 27 through the holes 12 of the mould plate $4b$ returns through the leg pipe $18a$ and the return pipe 18 into the gas cycle. Directions of the gas flow through the pipes shown in FIG. 1 are marked with arrows, while path of the gas passing from the leg pipe $17a$ into the chamber 23 in FIG. 2 is marked by arrow e, and the path of the gas flowing through the holes 12 into the mould space 5 is marked by arrow f. The same marks e and f were used in FIGS. $3a$ and $3b$ accordingly. It is noted that the gas injection method according to FIGS. $3a$, $3b$ offers the possibility that it is sufficient to inject gas under a lower pressure, e.g. 5 bar into the mould space 5 through the second hole group 11 from above (FIGS. $3a$, $3b$) in the lower range of zone I, where the compacting effect of the piston 8 is less effective and the material has a less density (the internal stress of the compacted mixture—as referred to—is at a maximum on the upper end of the zone I, then it gradually drops when going downwards; in this case, the pressure of the remaining discharge gas is about 2-3 bar. In any case, the pressure of the $CO_2$ gas injected into the zone I has to be selected so as to prevent it from escaping through the compacted layer of material situated above the zone I in the vicinity of the inlet port 6 of the mould 1. Since a quasi gastight condition exists also between the inner faces of the mould plates $4a$, $4b$ and the mixture, the $CO_2$ gas can not escape from the mould space 5 along the mould plates either. Injecting the gas into the zone I under two different pressures has the further advantage that the low-pressure gas cannot flow from below upwards to the inlet port 6, because this is prevented by the higher pressure gas forcing the low pressure gas towards the opposite mould plate $4a$, i.e. to a transversal passage through the mixture.

The chemical reaction between the $CO_2$ gas and the cement—i.e. the carbonation—just begins in zone I, but it takes place explosion-like (instantaneous reaction) in zone II. The chemical reaction consumes the $CO_2$ injected into the zone I, the pressure drops, and vacuum would develop in the material unless the $CO_2$ is replaced. Therefore, continuing the injection of $CO_2$ into the zone II through the leg pipe $17b$ and the chamber 24, the $CO_2$ gas consumed in the zone I during the chemical reaction, is replaced. In zone II, the $CO_2$ gas is injected under a lower pressure still exceeding the atmospheric one e.g. at 4 bar (it is unnecessary to press the gas under into the pores of the mixture, at a higher pressure), which flowing through the material, passes into the chamber 28 under a pressure not more than about 2 bar and returns to the gas cycle through the leg pipe $18b$ and the return pipe 18. By correct adjustment of the valve $18b'$, vacuum can be applied also in the zone II, but this is not essential.

Hardening of the mixture begins at a lesser extent already in zone I, while in the zone II its intensity completely stops the relaxation force. Thus, the building panel 22 (FIG. 1) in state of hardening is capable to pass downwards in the mould 1 unobstructed and continuously, the material is not pressed against the walls of the mould as in the upper part of the zone I (where the compressive force produced by the piston 8 forces downwards the still unhardened raw mixture). As a result of the chemical reaction of carbonation, vacuum will develop in the material.

The pressure of the $CO_2$ gas injected into the zone III is further reduced, gas at a pressure of e.g. 1 bar is fed thereto. The carbonation process in this zone is practically completed. The amount of the gas admitted to the zone III shall cover the still missing gas required for the whole carbonation reaction. This way, the detrimental loss of $CO_2$—adversely influencing the economic efficiency of the process—can be prevented at the lower end of the mould space 5, i.e. at the outlet port 7, where the compressed, already carbonated partly hardened material passes into the open air, merely by bringing about appropriate pressure conditions in the zone III, in other words: here is fed only a minimum amount (pressure) of the $CO_2$ gas. The pressure of the remaining $CO_2$ gas flowing into the chamber 29 (if no vacuum exists) is not much lower than the pressure of the admitted gas, e.g. 0.8–0.9 bar. Thus the carbonation reaction is safely completed. It is noted, that a vacuum of e.g. 0.5 bar can be brought about with the pump 32 also in the zones II and III in order to intensify the transversal gas flow in the chambers 28, 29.

Zone IV is a balancing zone where no $CO_2$ gas is fed to, here practically no chemical reaction takes place. Into the chambers 27 and 30 the $CO_2$ gas flowing eventually hereto along the mould plates 4a, 4b flows outwards from within, the amount and pressure of which were selected in the zone III so as to be sufficient for completing the carbonation reaction. If the pressure of gas was correctly selected in the zone III, the gas should just blow out through the control valves 20a, 21a. Thus, with the aid of these control valves 20a, 21a the pressure of the $CO_2$ gas can be balanced in the zone IV. Consequently the production technology does not entail any overconsumption of $CO_2$, because practically no perceptible amount of gas escape either on the top or the bottom of the mould 1, which is a significant factor for the economic efficiency.

If, however not pure $CO_2$ gas but a gas mixture was used for the carbonation that contains $CO_2$ only in part (e.g. 30%), the neutral gas component(s) is (are) not used up for the carbonation reaction, and in this case the amount of gas (air) emitted through the control valves 20a, 21a may also be fairly large, and in this case the valves 20a, 21a function as air vent.

Although the individual phases of the carbonation process are realized separately from one another in space and time, the whole process of production is continuous, since the material to be moulded and hardened to building panel passes through the mould space 5 continuously. The building panel 22 discharged continuously in infinite length through the outlet port 7 is cut to size by the transversal saw 21 its operation being synchronized with the pressing rate, thus, there are obtained partially hardened building panels—having e.g. a strength representing about 30% of the 28-day-strength which can be further cured—by any known method—by artificial ageing of by allowing to stand.

Figure 9A:
FIGS. 9a–9f building units of different cross sectional shapes prepared with the method according to the invention, to illustrate the extensive applicability of the invention.
Figure 9B:
Figure 9C:
Figure 9D:
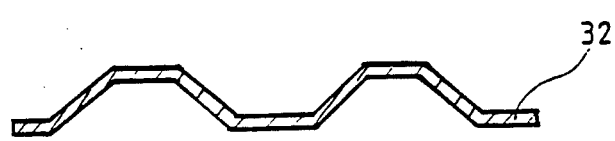
Figure 9E:
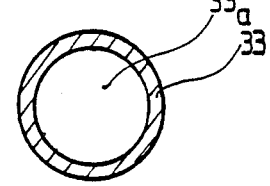
Figure 9F:
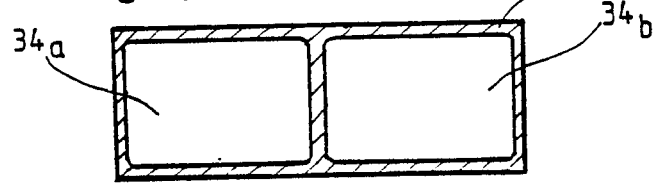
Figure 10:
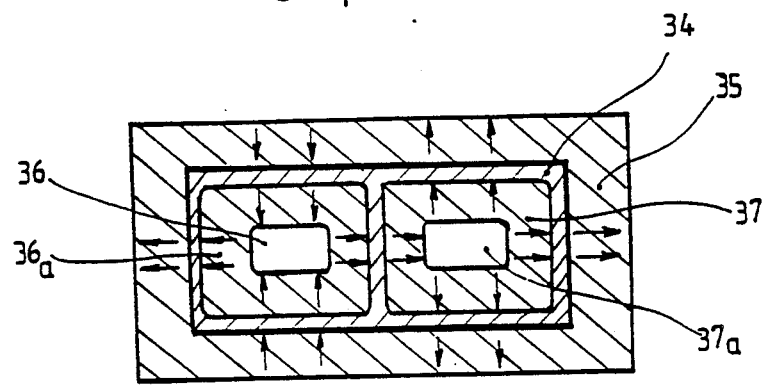
FIG. 10 a production model of the building unit shown in FIG. 9f produced with carbonation method according to the invention.

Cross section of the building panel 22 produced with the apparatus according to FIGS. 1 and 2, is shown in FIG. 9a but it is easily conceivable that with the aid of the process and apparatus according to the invention, any optional cross section of the building units can be produced—within practical limits—by an appropriate selection of the cross sectional shape of the mould space and the piston. Cross section of the building unit 30 according to FIG. 9b is wedge-shaped, while the building unit 31 shown in FIG. 9c is of wavy-shape. A trapezoid building unit 32 is shown in FIG. 9d. In fact, the production of a hollow building unit is also possible with the aid of the invention. The element 33 shown in FIG. 9e has an annular cross section whose circular hole is marked with reference number 33a. The rectangular building unit shown in FIG. 9f has two cavities 34a and 34b. Naturally the production of hollow building units requires a suitable mould to form the cavities; the construction of the mould structure for the building element according to FIG. 9f is shown in FIG. 10. Ducts and holes are formed in the outer mould frame 34 as well as in the walls of the hollow internal mould cores 36, 37 (the cavities are marked with reference numbers 36a and 37a)—similarly as shown in FIGS. 3a, 3b—for injection of the $CO_2$ gas, or for putting it through the material passing through the mould. A possible way of having the gas flown is shown in FIG. 1 by arrows, but for the better overview, illustration of the ducts and holes is omitted.

Moreover, the amount of $CO_2$ gas required for carbonation is always proportionate to the quantity of cement used according to the given formula, making out about 8–10 mass % thereof. The gas mixture used for carbonation—if not pure $CO_2$ is used—should contain expediently at least 30% of $CO_2$.

The invention is described in further details by way of examples as follows:

EXAMPLE 1

20 mm thick, 60×100 cm building panels are produced with the process according to the invention using the apparatus shown in FIGS. 1 and 2. Composition of the raw afterhardening mixture to be moulded by pressing and treated with carbonation is the following:

| | |
|---|---|
| cement | 42 mass % |
| caustic lime | 2 mass % |
| quartzsand | 42 mass % |
| water | 14 mass % |

Figure 4:
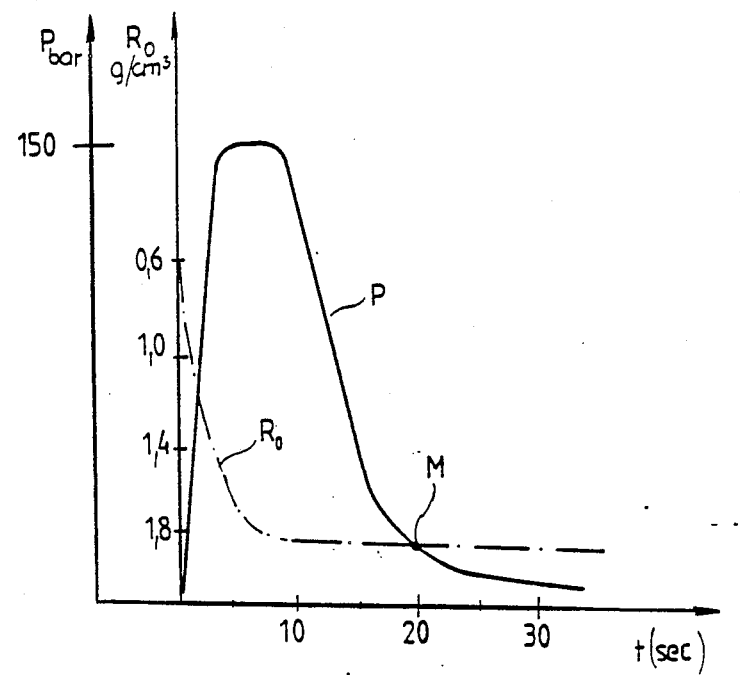
FIG. 4 a graph illustrating the change of the pressure and the body's density within the mixture as a function of the time, taking place during compression of the afterhardening mixture prepared with non-elastic additive.

FIG. 4 illustrates the trend of the internal stress (pressure) P and the density $R_o$ as a function of the time consequent upon compression in the mixture not containing elastic (organic) additive-component. In the initial phase of the pressing process both the internal stress and the density are rapidly increasing, but after a short time, increase of the density slows down, the curve $R_o$ is nearly parallel to the axis of time (it hardly approaches to the latter) while the internal stress P upon reaching a maximum, remains essentially constant for a short time, then it rapidly drops. The internal stress at the intersection M of the curves P and $R_o$ is only as high, at which the density $R_o$ of the mixture practically would not change even if the compressive force was stopped. (Moreover, the pressure and density of all those afterhardening mixtures are characterized by curves similar to the graph in FIG. 4, the moisture content of which is at most 50% and their additives are inorganic, rigid materials e.g. sandy gravel, gravel, siliceous earth, fibreglass etc.).

The pressure conditions—i.e. trend of the internal stresses—as a function of the time, arising while pressing in the mixture described in this example, with the reciprocating piston 8 of the apparatus as shown in FIGS. 1–3, are illustrated with the set of curves according to FIG. 6. Each curve P represents the internal stress-influence line of the compression performed with each piston stroke. FIG. 6. clearly shows that in the uppermost layer of the mixture in the mould space 5 (FIG. 1) always the same—and maximum—internal stress prevails, and it exists continuously, because the upper horizontal parts of the curves P (see also FIG. 4) are practically passing into one another. Thus, as a result of the mechanical pressing process in this upper layer of the material, the quasi gastigh condition is ensured until the piston 8 of the apparatus stamps the mixture into the mould 1.

The $CO_2$ gas is injected into the material being present in the mould 1 and moving downwards in zones I–III under the following pressure:

| Zone I: | entry | 6 bar |
|---|---|---|
| | exit | 3 bar |
| Zone II: | entry | 2 bar |
| | exit | 1 bar |
| Zone III: | entry | 0.4 bar |
| | exit | 0 bar |

The gas incidentally flowing down from zone III along the inner faces of the mould plates is emitted in the balancing zone IV; the amount of gas may be only at minimum.

The material passes through the mould space 5 continuously at a rate of 1.0 m/sec.

Figure 8:
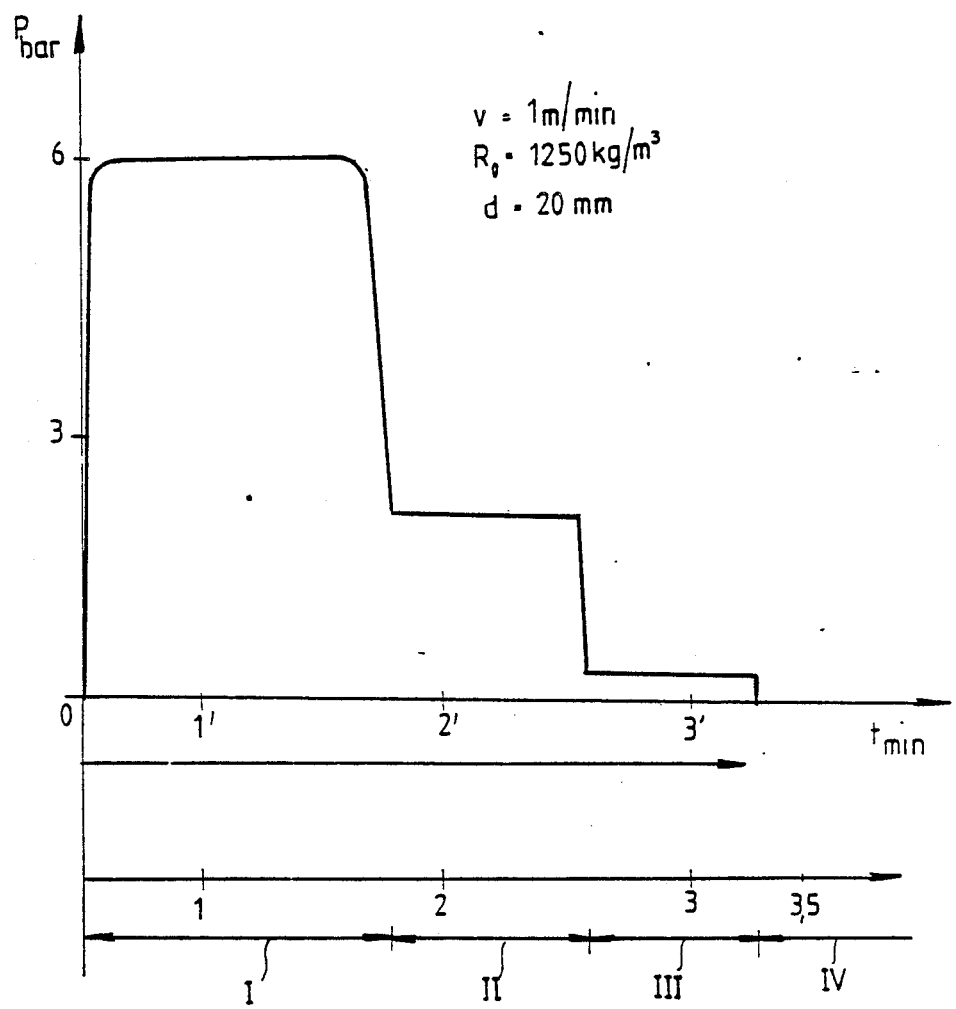
FIG. 8 a diagram showing the gas pressure, path and time.

The gas pressure, path and time diagram in FIG. 8—where V is the velocity of the material moving down in the mould, $R_o$ is the density of the afterhardening mixture, and d is the thickness of the produced building panel—proves that the material passes through zone I—where the pressure of $CO_2$ gas is at the maximum (6 bar)—in about two minutes, whereas its passage through the zones II and III takes barely one minute, while the gas pressure gradually drops to zero, and the gas do not has any overpressure in zone IV. The curve in FIG. 8 represents the internal relaxation force proportional to the compressive force produced by the piston, in other words, the intensity of the force required for compaction and passing on the material to be pressed is always proportional to the relaxation force affecting the sides of the mould.

The bending strength of the material leaving through the outlet port 7 of the mould 1 is about 35 kp/cm$^2$ (about 30% of the final, 28-day-strength), and its density is 1250 kg/m$^3$. The panel material continuously leaving the mould is cut according to the planned size with a cutting disc. The panels partly hardened by carbonation are stored standing on their edge.

EXAMPLE 2

14 mm thick, 163×1250×4000 mm hollow building units are produced with the process according to the invention using the apparatus as shown in FIG. 1–3. Composition of the raw afterhardening mixture to be shaped by pressing and treated by carbonation is the following:

| cement | 58 mass % |
|---|---|
| waterglass | 1 mass % |
| woodshavings | 14 mass % |
| water | 24 mass % |
| caustic lime | 3 mass % |

Figure 5:
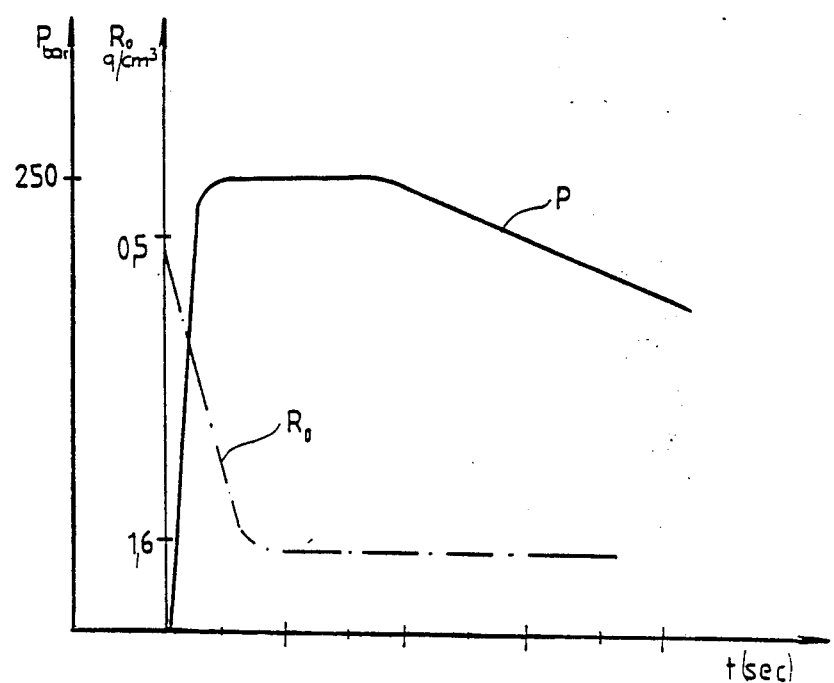
FIG. 5 a characteristic curve related to the afterhardening mixture, same as the one shown in FIG. 4, but prepared with elastic additive.

FIG. 5 illustrates the trend of internal stress (pressure) P and density $R_o$ as a function of the time consequent upon compression of such mixture—not containing any elastic (organic) additive-component. (Similar curves are obtained if instead of woodshavings other elastic, organic additive-components, e.g. cellulose, vegetable fibres, vegetable scrapings, synthetic fibres, etc., or a mixture containing their optional combination are used for preparation of the mixture.) In this case, the internal stress P—upon reaching a maximum value and when the corresponding horizontal or essentially horizontal curve-section is longer than the corresponding part of curve P in FIG. 4—drops only at a slow rate, maintaining the compressive force over a longer time is required to keep the density $R_o$ on a constant value. When the compressive force is stopped (before hardening of the material) the internal stress existing in the mixture would result in a decrease of the density, because the material would spring back (relaxation effect).

If the raw mixture of above composition was pressed into the mould 1 with the reciprocating piston 8 of the apparatus shown in FIGS. 1 and 2, the pressure conditions according to FIG. 7 develop in the mixture. The horizontal section of the internal stress-influence lines P corresponding to each piston stroke in this case, too will pass continuously into one another, i.e. always the same, maximum stress will prevail in the mixture in the vicinity of the inlet port 6 of the mould space 5 until the material is continuously stamped by the piston 8 into the mould 1. This way, due to the mechanical compaction, the quasi gastight condition is ensured during the process of production.

Pressure of the gas injected into and emerging from the zones I–III is the same as the one shown in Example 1 and also the gas pressure, path and time diagram is similar to that of FIG. 8, however, the volume weight and strength of the end-product—consequent upon the difference appearing in the additive—are lower.

The main advantage of the invention is that it enables continuously the large-scale production of building units, the strength of which, when discharged from the mould, is at least 30% of the final (28-day) strength, thus, their production is extremely efficient and economical. A further advantage is the simplicity of the apparatus according to the invention, consequently its cost of investment is relatively low, and it is suitable for the production of units from a raw mixture containing either elastic (fibrous), or solid granular additive.

Naturally, the invention is not limited to the above described examples of the process and to the illustrated and explained embodiments of the apparatus, but it can be realized in many ways within the protective scope defined by the claims. The mould should not necessarily be of an upright position, the building units may be produced also in an inclined or even in a horizontal mould. The process can be realized according to several formulae different from those described in the examples. The method of passing the gas through the material in motion is realizable in many ways different from the one described in the foregoing deviation from those described above is conceivable according to several other aspects, without overstepping the protective scope defined by the claims.

What we claim is:

1. Process for the production of building units from an afterhardening mixture containing cement, additives and water as binding material, the process including the steps of admitting the afterhardening mixture into a die which has an inlet port for insertion of the afterhardening mixture and an outlet port for removal of the afterhardening mixture in compacted form, injecting $CO_2$ gas into the afterhardening mixture and bringing about a carbonation reaction with the afterhardening mixture, pressing the afterhardening mixture continuously in the die while injecting the $CO_2$ gas into the afterhardening mixture under pressure, controlling the injecting of the $CO_2$ gas so as to provide a greater amount of the gas flowing through the afterhardening mixture near the inlet port of the die as compared to the amount of the gas flowing through the afterhardening mixture near the outlet port, mechanically compacting the afterhardening mixture at the inlet port and faces of the die, and thereby forming a generally gastight seal between the afterhardening material and the die, controlling the injecting of the $CO_2$ gas into the die so that full completion or essentially full completion of the carbonation reaction occurs, and removing the afterhardening mixture in compacted form from the die and separating the afterhardening mixture in compacted form into the building units.

2. Process according to claim 1, including pressing the afterhardening material into the die with a reciprocating device.

3. Process according to claim 1 including injecting the $CO_2$ gas into the die at least through one confining face under pressure exceeding atmospheric pressure, passing the $CO_2$ gas through the afterhardening mixture from one face of the die to another, and applying vacuum to at least one face of the die to assist the flow of the $CO_2$ gas through the afterhardening mixture.

4. Process according to claim 1 including injecting the $CO_2$ gas at a pressure of about 3-6 bar into pores of the afterhardening mixture in a first zone in the vicinity of the inlet port, injecting the $CO_2$ gas in the die at a pressure of about 2-3 bar in a second zone in an amount which is essentially equivalent to the gas consumed by carbonation of the afterhardening mixture, thereby providing for continuation of the carbonation reaction, injecting the $CO_2$ gas into said die in a third zone at a pressure of about 1-2 bar whereby essentially full completion of the carbonation reaction is realized.

5. Process according to claim 4 including creating a balancing zone in the die situated directly upstream of the outlet port, checking flow of the gas in the balancing zone, and injecting the gas into the first, second or third zones as a function of the amount of gas flowing out of the balancing zone.

6. Process according to claim 1, wherein the separating step includes the cutting into building units of carbonation-hardened mixture leaving the die.

7. Process according to claim 1, including injecting the $CO_2$ gas into the die with a gas mixture, containing at least about 30% $CO_2$.

8. Process according to claim 1, including injecting the $CO_2$ gas into the afterhardening mixture prior to feeding the afterhardening mixture into the die.

* * * * *